United States Patent [19]

Fuei et al.

[11] Patent Number: 5,543,473
[45] Date of Patent: Aug. 6, 1996

[54] ELECTROPHOTOGRAPHIC PHOTOSENSITIVE MEMBER, AND ELECTROPHOTOGRAPHIC APPARATUS, DEVICE UNIT, AND FACSIMILE MACHINE EMPLOYING THE SAME

[75] Inventors: Naoki Fuei, Kawaguchi; Takashi Tanaka, Kawasaki, both of Japan

[73] Assignee: Canon Kabushiki Kaisha, Tokyo, Japan

[21] Appl. No.: 232,466

[22] Filed: Apr. 22, 1994

Related U.S. Application Data

[63] Continuation of Ser. No. 858,030, Mar. 26, 1992, abandoned.

[30] Foreign Application Priority Data

Mar. 28, 1991 [JP] Japan .................................. 3-087254

[51] Int. Cl.⁶ .............................. C08L 75/04; C08L 59/00
[52] U.S. Cl. ........................................... 525/399; 358/400
[58] Field of Search ............................. 525/399; 358/400

[56] References Cited

U.S. PATENT DOCUMENTS

| | | | |
|---|---|---|---|
| 4,582,869 | 4/1986 | Waggoner | 525/399 |
| 4,607,937 | 8/1986 | Minami | 355/3 |
| 4,640,949 | 2/1987 | Wagman | 525/399 |
| 4,707,525 | 11/1987 | LaNieve, III et al. | 525/399 |
| 4,804,716 | 2/1989 | Flexman, Jr. | 525/399 |
| 4,839,690 | 6/1989 | Onoda et al. | 355/211 |
| 4,845,161 | 7/1989 | Richardson | 525/399 |
| 4,946,906 | 8/1990 | Yano et al. | 525/399 |
| 4,978,725 | 12/1990 | Reske et al. | 525/399 |
| 5,019,861 | 5/1991 | Surti | 355/200 |
| 5,023,660 | 6/1991 | Ebata et al. | 355/200 |
| 5,286,807 | 2/1994 | Flexman, Jr. | 525/399 |

FOREIGN PATENT DOCUMENTS

| | | |
|---|---|---|
| 0266365 | 3/1990 | Japan . |
| 3-47859 | 2/1991 | Japan . |

OTHER PUBLICATIONS

Skeist, I., Handbook of Adhesives; Van Nostrand Reinhold Co. (1962), pp. 481–487, 512–513.
Patent Abstracts of Japan, vol. 12, No. 95 (P–681) of Mar. 29, 1988 for JPA 62–229273.
Patent Abstracts of Japan, vol. 14, No. 536 (M–1052), Nov. 27, 1990 for JPA 2–225862.

*Primary Examiner*—Thomas Hamilton, III
*Attorney, Agent, or Firm*—Fitzpatrick, Cella, Harper & Scinto

[57] ABSTRACT

The present invention is to provide an electrophotographic photosensitive member in which drum flange and a drum gear is strongly bonded to the support and which is inexpensive and free from bonding failure even when a high rotational torque is applied, the drum flange or the drum gear containing a thermoplastic polyurethane resin and a polyacetal resin. The present invention further provides an electrophotographic apparatus, a device unit and a facsimile machine employing the above electrophotographic photosensitive member.

8 Claims, 3 Drawing Sheets

ELECTROPHOTOGRAPHIC PHOTOSENSITIVE MEMBER, AND ELECTROPHOTOGRAPHIC APPARATUS, DEVICE UNIT, AND FACSIMILE MACHINE EMPLOYING THE SAME

This application is a continuation of application Ser. No. 07/858,030 filed Mar. 26, 1992, now abandoned.

BACKGROUND OF THE INVENTION

1. Field of the Invention

The present invention relates to an electrophotographic photosensitive member, particularly to an electrophotographic photosensitive member having a member comprising a specific resin.

The present invention relates also to an electrophotographic apparatus, a device unit, and a facsimile machine employing the above electrophotographic photosensitive member.

2. Related Background Art

Generally, an electrophotographic photosensitive member (hereinafter simply referred to as a "photosensitive member") is constituted of a photosensitive drum which is made of a cylindrical support and a photosensitive layer formed thereon, and a drum flange and/or a drum gear which is bonded with an adhesive to the one end or the both ends of the photosensitive drum for rotating the photosensitive drum. On driving the photosensitive member, a high rotational torque is applied to the drum flange or the drum gear. Therefore the drum flange or the drum gear is made of a polycarbonate resin having high adhesiveness to the photosensitive drum support which is usually made of aluminum.

On the other hand, polyacetal resins are widely used as mechanical parts such as gears, rollers, bearings and screws because of their superiority in fatigue resistance, abrasion resistance, moldability, size stability, and so forth. Further, polyacetal resins are inexpensive and have low moldingtemperature compared with polycarbonate resins. The polyacetal resins, however, cannot be bonded with an adhesive owing to their high solvent resistance. Accordingly, screw fixing, ultrasonic bonding, heat bonding, caulking, and the like method are employed for bonding the polyacetal resin to other members. Such bonding methods are disadvantageous in simplification of the production process, cost reduction, and mass-production in comparison with the adhesive bonding.

SUMMARY OF THE INVENTION

The present invention is to provide an electrophotographic photosensitive member in which a drum flange and a drum gear are strongly bonded to the support and which is inexpensive and free from bonding failure even when a high rotational torque is applied.

The present invention also intends to provide an electrophotographic apparatus, a device unit, and a facsimile machine employing the electrophotographic photosensitive member.

The present invention provides an electrophotographic photosensitive member comprising a photosensitive drum, and a drum flange and/or a drum gear, the drum flange and/or the drum gear containing a thermoplastic polyurethane resin and a polyacetal resin.

The present invention further provides an electrophotographic apparatus, a device unit and a facsimile machine employing the above electrophotographic photosensitive member.

DESCRIPTION OF THE PREFERRED EMBODIMENT

Figure 1:
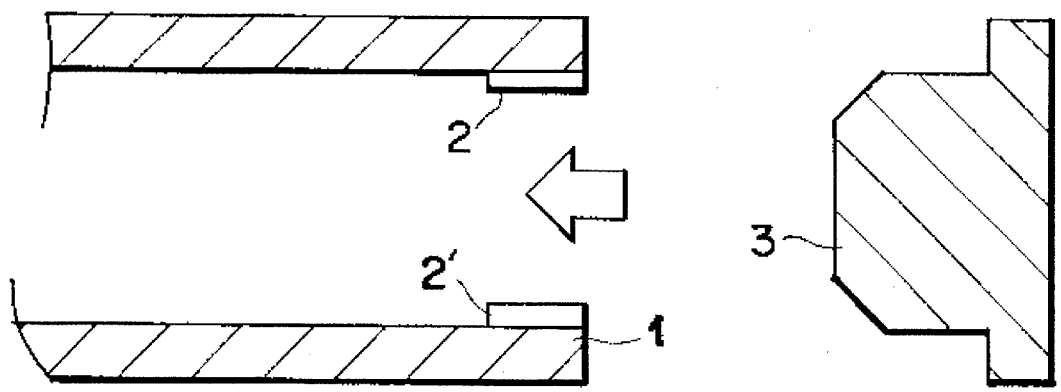
FIG. 1 and 2 are simplified sectional views of a photosensitive drum having a drum flange or a drum gear bonded thereto with an adhesive.
Figure 2:
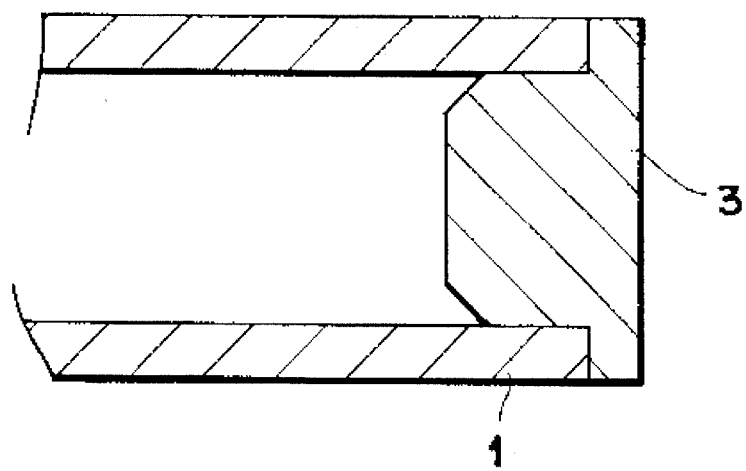

The photosensitive member of the present invention comprises a drum flange or a drum gear containing a thermoplastic polyurethane resin and a polyacetal resin.

As mentioned above, it is not easy to bond a polyacetal resin strongly to another member by use of an adhesive such as an instantaneous adhesive, anaerobic adhesive, and an epoxy resin adhesive. As the result of comprehensive study, the inventors of the present invention have found that the required strong bonding of a photosensitive drum to a drum flange or a drum gear is obtained by use of a resin composed of a thermoplastic polyurethane resin and a polyacetal resin as well as the excellent mechanical strength of the resin, and thus accomplished the present invention.

The polyacetal resin employed in the present invention has a component having the structure represented by the formula below:

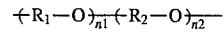

wherein $R^1$ and $R^2$ are alkylene group, $n^1$ represents a positive integer and $n^2$ represents 0 or a positive integer, wherein the alkylene group includes methylene, ethylene and propylene group, preferably methylene and ethylene.

It is especially preferable for the polyacetal resin of the present invention to contain a component of the following formula.

wherein $n^3$ and $n^4$ represent a positive integer respectively.

In the present invention other resins and various additives etc. can be mixed for use within the range that the beneficial effects of the present invention are not reduced.

The thermoplastic polyurethane resin is a reaction product of an isocyanate compound with a polyol. The isocyanate compound includes 4,4'-methylene-bis(isocyanstophenyl), 1,6-hexamethylene diisocyanate, 2,4-tolylene diisocyanate, isophorone diisocyanate, and the like. The polyol includes polymer polyols such as polyadipate ester diols, polyalkylene ether diols, polylactone diols, and of polycarbonate ester diols; and low-molecular polyols such as ethylene glycol, propylene glycol, 1,2-ethanediol, 1,4-butanediol, 1,6-hexanediol, and glycerine. The mixed resin of a polyacetal resin and a thermoplastic polyurethane resin of the present invention is preferable as a material for a drum flange or a drum gear in terms of the mechanical strength and bondability or the balance of the two properties compared with other resins or mixed resins.

In the present invention, the mixing ratio of the polyacetal resin and the thermoplastic polyurethane resin, that is, the content of the polyurethane resin is in the range of from 5 to 25% by weight based on the total weight of the resin blend. At the thermoplastic polyurethane resin content of less than 5% by weight, sufficient adhesion is not obtained, while at a content of more than 25% by weight, the thermoplastic polyurethane resin decomposes during molding processes such as injection molding, extrusion molding and compression molding and a color change tends to occur.

The adhesive used for bonding the photosensitive drum with the drum flange or the drum gear in the present invention includes instantaneous adhesives, anaerobic adhesives, reaction type adhesives, and the like. From among the adhesives, instantaneous adhesives are preferred in view of high adhesiveness to aluminum of which a photosensitive drum support is usually made, absence of a primer, and high productivity. Of the instantaneous adhesives, those mainly composed of α-cyanoacrylate are preferred because of their high bonding strength.

The bonding between the photosensitive drum and the drum flange or the drum gear is carried out as shown in FIG. 1 in such a manner that the entire bonding portion around the inside face of the photosensitive drum 1 is coated uniformly with an adhesive 2 by means of a sprayer, a dispensor, or the like and subsequently the drum flange or the drum gear 3 is bonded to the photosensitive drum 1. Alternatively the entire bonding portion of the drum flange or the drum gear is coated uniformly with an adhesive and subsequently the flange or the gear is bonded to the photosensitive drum.

The photosensitive member of the present invention is useful not only for electrophotographic copying machines but is also useful in various fields of electrophotography such as laser beam printers, CRT printers, LED printers, liquid crystal printers, facsimile machines, and laser engraving machines.

Figure 3:
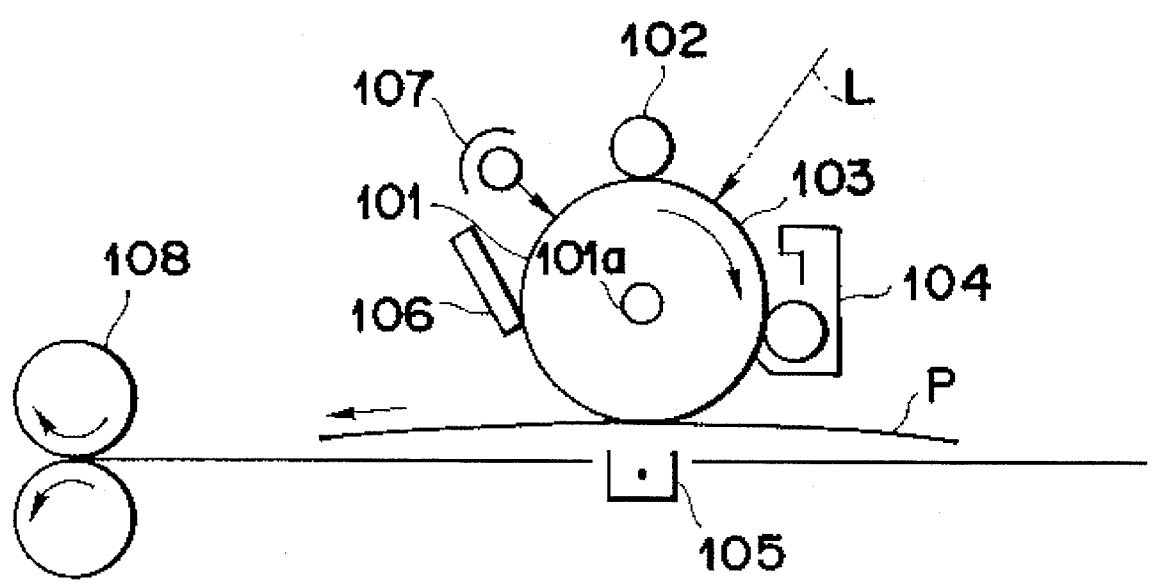
FIG. 3 illustrate roughly the constitution of an electrophotographic apparatus employing the photosensitive member of the present invention.

FIG. 3 schematically illustrates an example of the constitution of an ordinary transfer type of electrophotographic apparatus employing the photosensitive member of the present invention.

In FIG. 3, a drum type photosensitive member 101 serves as an image carrier, being driven to rotate around the axis 101a in the arrow direction at a predetermined peripheral speed. The photosensitive member 101 is charged positively or negatively at the peripheral face uniformly during the rotation by an electrostatic charging means 102, and then exposed to image-exposure light L (e.g. slit exposure, laser beam-scanning exposure, etc.) at the exposure portion 103 with an image-exposure means (not shown in the drawing), whereby electrostatic latent images are sequentially formed on the peripheral surface in accordance with the exposed image.

The thus formed electrostatic latent image is developed with a toner by a developing means 104. The toner-developed images are sequentially transferred by a transfer means 105 onto a surface of a transfer-receiving material P which is fed between the photosensitive member 101 and the transfer means 105 synchronously with the rotation of the photosensitive member 101 from a transfer-receiving material feeder not shown in the drawing.

The transfer-receiving material P having received the transferred image is separated from the photosensitive member surface, and introduced to an image fixing means 108 for fixation of the image and sent out of the copying machine as a duplicate copy.

The surface of the photosensitive member 101, after the image transfer, is cleaned with a cleaning means 106 to remove any remaining non-transferred toner, and is treated for charge elimination with a pre-exposure means 107 for repeated use for image formation.

The generally employed charging means 102 for uniformly charging the photosensitive member 101 is a corona charging apparatus, but direct charging with a charging roller is also possible. The generally employed transfer means 105 is also a corona charging means. In the electrophotographic apparatus, two or more of the constitutional elements of the above described photosensitive member, the developing means, the cleaning means, etc. may be integrated into one device unit, which may be made demountable from the main body of the apparatus. For example, at least one of the charging means, the developing means, and the cleaning means is combined with the photosensitive member 101 into one device unit which is demountable from the main body of the apparatus by aid of a guiding means such as a rail in the main body of the apparatus. An electrostatic charging means and/or a developing means may be combined with the aforementioned device unit.

When the electrophotographic apparatus is used as a copying machine or a printer, the light L for optical image exposure may be projected onto the photosensitive member as reflected light or transmitted light from an original copy, or otherwise the information read out by a sensor from an original is signalized, and according to the signalized information light L is projected onto a photosensitive member, by scanning with a laser beam, driving an LED array, or driving a liquid crystal shutter array.

Figure 4:
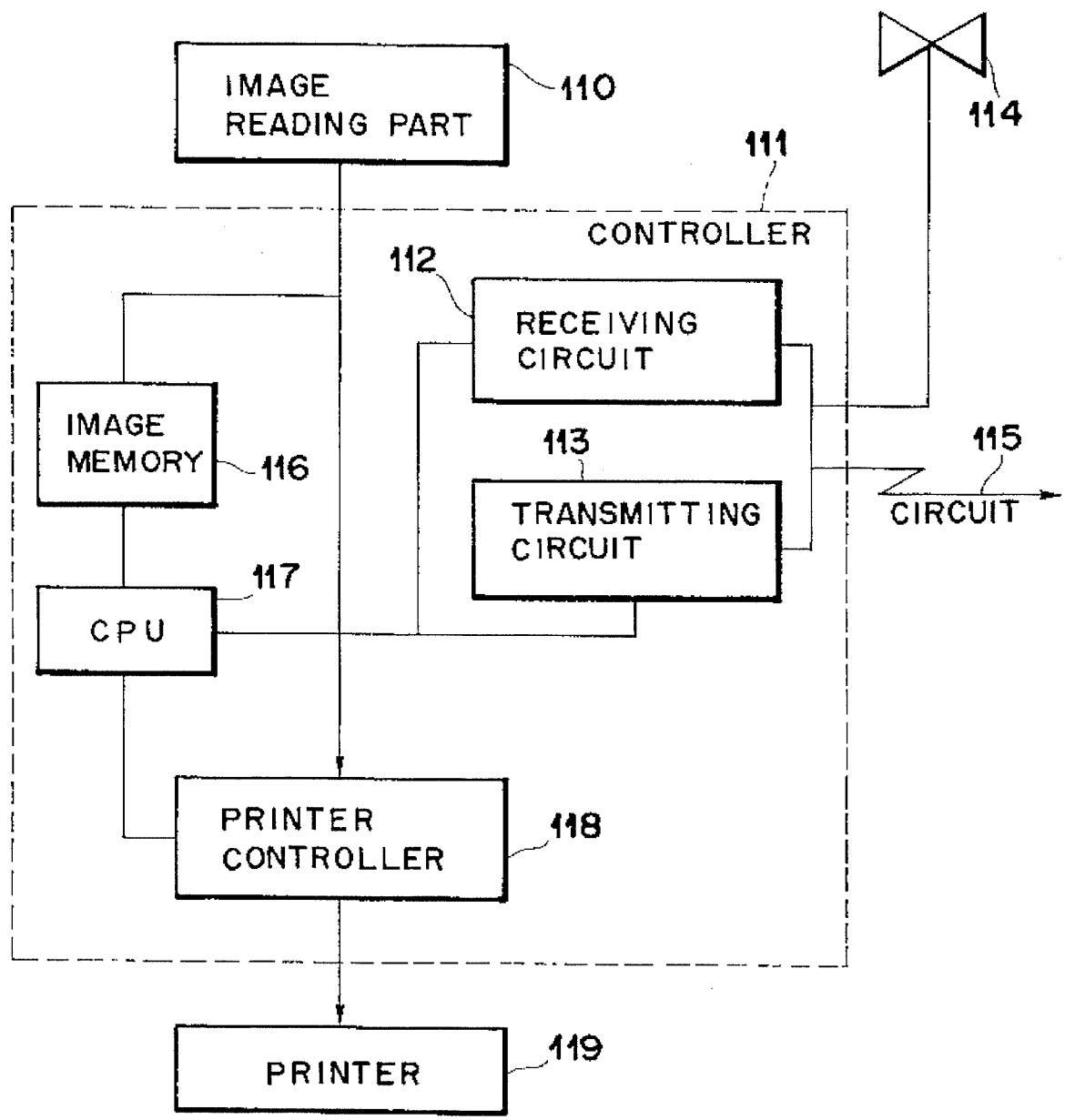
FIG. 4 illustrates an example of a block diagram of a facsimile system employing the photosensitive member of the present invention.

When the electrophotographic apparatus is used as a printer of a facsimile machine, the optical image exposure light L is for printing the received data. FIG. 4 is a block diagram of an example of this case.

A controller 111 controls an image reading part 110 and a printer 119. The entire operation of the controller 111 is controlled by a CPU 117. Readout data from the image reading part 110 is transmitted through a transmitting circuit 113 to the other communication station. Data received from the other communication station is transmitted through a receiving circuit 112 to a printer 119. The image data is stored in image memory 116. A printer controller 118 controls a printer 119. The numeral 114 denotes a telephone set.

The image received through a circuit 115, namely image information from a remote terminal connected through the circuit, is demodulated by the receiving circuit 112, treated for decoding of the image information in CPU 117, and successively stored in the image memory 116. When at least one page of image information has been stored in the image memory 116, the images are recorded in such a manner that the CPU 117 reads out the one page of image information, and sends out the decoded one page of information to the printer controller 118, which controls the printer 119 on receiving the one page of information from CPU 117 to record the image information.

During recording by the printer 119, the CPU 117 receives the subsequent page of information.

Images are received and recorded in the manner as described above.

The present invention is described in more detail by reference to examples.

EXAMPLE 1

To 80 parts by weight of a polyacetal resin (trade name "Juracon M-90-$_{02}$", made by Polyplastics K. K.), there was added 20 parts of a thermoplastic polyurethane resin (trade name "Miractolan E395", made by Nippon Miractolan K. K.). The mixture was dry-blended with a tumbling mixer, and melt-blended and pelletized by means of a single screw extruder (FS40-22EX, made by Ikegai Corporation). The extrusion was carried out under the conditions of the die outlet temperature of 190° C., the cylinder temperatures of 190° C. at the front portion, 170° C. at the middle, and 160° C. at the rear, the die diameter of 2 mm, the screw revolution rate of 60 rpm, and the screw diameter of 40 mm.

The resulting mixed resin of polyacetal resin containing the thermoplastic polyurethane resin at a content of 20% by weight was molded into a drum flange having the outside diameter of bonding portion of 28.45 mm by injection molding under the molding conditions of the nozzle temperature of 200° C., the cylinder temperature of 180° C. at the tip, 170° C. at the middle, and 160° C. at the rear, the injection pressure of 800 kg/cm$^2$, and the mold temperature of 60° C. at the cavity and 60° C. at the core.

The molded drum flange was bonded to a photosensitive drum (supporting member is a solid drawn aluminum tube with inside diameter of 28.5 mm, and length of 260.5 mm) with an instantaneous adhesive (trade name "Arron alpha 432FTW", made by Toagosei Chemical Industry Co., Ltd., quantity: 0.08 g). The instantaneous adhesive was completely cured at a temperature of 25° C. and a relative humidity of 60% for 48 hours.

On the resulting photosensitive member the bond-breaking torque was measured by rotating the photosensitive member at a rate of 35 rpm and applying torque in the direction reverse to the drum rotation. The bonding break occurred at the torque of 190 kg-cm. The portion of the bonding break was examined and it was found that the break was a mixed breaking of the drum flange surface and the adhesive layer.

EXAMPLE 2

A mixed polyacetal resin containing a thermoplastic polyurethane resin used in Example 1 was injection-molded into a drum flange under the same molding conditions as in Example 1. This drum flange was bonded to the same photosensitive member as in Example 1 by use of an adhesion primer (trade name: TB1390B, made by Three Bond K. K.) and an anaerobic adhesive (trade name TB1375B, made by Three Bond K. K., quantity 0.08 g). The anaerobic adhesive was completely cured at a temperature of 25° C. and a relative humidity of 60% for 48 hours.

The bond-breaking torque of the resulting photosensitive member was 160 kg-cm according to the measurement in the same manner as in Example 1. The examination of the bonding break portion showed the break was the mixed type break.

EXAMPLE 3

A drum flange was prepared by injection molding in the same manner as in Example 1 except that the mixed polyacetal resin contained the thermoplastic polyurethane resin at a content of 10% by weight. The drum flange was bonded to a photosensitive member in the same manner as in Example 1.

The bond-breaking torque of the resulting photosensitive member was 162 kg-cm according to the measurement in the same manner as in Example 1. The examination of the bonding break portion showed the break was mixed type break.

EXAMPLE 4

A drum flange was prepared by injection molding in the same manner as in Example 1 except that the polyacetal resin contained the thermoplastic polyurethane resin at a content of 5% by weight. The drum flange was bonded to a photosensitive member in the same manner as in Example 1.

The bond-breaking torque of the resulting photosensitive member was 112 kg-cm according to the measurement in the same manner as in Example 1. The examination of the bonding break portion showed the break is a mixed type break.

EXAMPLE 5

A drum flange was prepared by injection molding in the same manner as in Example 1 except that the polyacetal resin contained the thermoplastic polyurethane resin at a content of 3% by weight. The drum flange was bonded to a photosensitive member in the same manner as in Example 1.

The bond-breaking torque of the resulting photosensitive member was 78 kg-cm according to the measurement in the same manner as in Example 1. The examination of the bonding break portion showed the break was a mixed type break.

Comparative Example 1

A polyacetal resin (a copolymer, trade name "Juracon M90-$_{02}$, made by Polyplastics K. K.) was injection-molded under the same condition as in Example 1. The drum flange was bonded to a photo-sensitive drum in the same manner as in Example 1.

The bond-breaking torque of the resulting photosensitive member was measured in the same manner as in Example 1. The bonding break occurred at 55 kg-cm. The examination of the bonding break portion showed the break was an interfacial break between the drum flange and the adhesive.

Comparative Example 2

A polyacetal resin (trade name "Juracon M90-$_{02}$, made by Polyplastics K. K.,) was injection-molded under the same condition as in Example 1. The drum flange was bonded to a photo-sensitive drum in the same manner as in Example 2.

The bond-breaking torque of the resulting photosensitive member was 61 kg-cm according to the measurement in the same manner as in Example 1. The examination of the bonding break portion showed that the failure was caused by an interfacial break.

Comparative Example 3

A polycarbonate resin (trade name: Eupiron LS2030, made by Mitsubishi Gas Chemical Co., Inc., a resin containing a fluoroplastic powder at a content of 15% by weight) was injection-molded into a drum flange under the molding conditions of the nozzle temperature of 300° C., the cylinder temperature of 300° C. at the tip portion, 290° C. at the middle portion, and 260° C. at the back portion, the injection pressure of 1050 kg/cm$^2$, and the mold temperature of 85° C. at the cavity and 85° C. at the core. The molded drum flange was bonded to a photosensitive member in the same manner as in Example 1.

The bond-breaking torque of the resulting photosensitive member was 150 kg-cm according to the measurement in the same manner as in Example 1. The examination of the bonding break portion showed the break is a mixed type break.

Comparative Example 4

Using a thermoplastic polyurethane resin (Commercial name: Miractolan E-395, product of Nippon Miractolan K. K.,), the drum flange of the same shape as in Example 1 was prepared by injection molding under the molding conditions of the nozzle temperature of 190° C., the cylinder temperature of 185° C. at the tip, 180° C. at the middle, and 160° C. at the rear, the injection pressure of 500 kg/cm², and the mold temperature of 30° C. at the cavity and 30° C. at the core. The drum flange thus obtained was bonded to the photosensitive drum in the same manner as in the Example 1.

The bond-breaking torque of the resulting photosensitive member was 52 kg-cm according to the measurement in the same manner as in Example 1. The break is not the bonding break but the drum flange itself was broken.

The results of Examples and Comparative Examples are summarized in the Table below.

TABLE

|  | Thermoplastic polyurethane resin content (% by weight) | Bond-breaking torque (kg-cm) | Type of bonding break |
| --- | --- | --- | --- |
| Example |  |  |  |
| 1 | 20 | 190 | Mixed |
| 2 | 20 | 160 | Mixed |
| 3 | 10 | 162 | Mixed |
| 4 | 5 | 112 | Mixed |
| 5 | 3 | 78 | Mixed |
| Comparative Example |  |  |  |
| 1 | 0 | 55 | Interfacial |
| 2 | 0 | 61 | Interfacial |
| 3 | 0 | 150 | Mixed |
| 4 | 100 | 52 | — |

The present invention improves the bonding of a drum flange or a drum gear to a photosensitive member by use of a polyacetal resin containing a thermoplastic polyurethane resin for the material of the flange or the gear. Thus the photosensitive member of the present invention may be used under high rotational torque.

Furthermore, in comparison with conventional drum flanges and drum gears of drum type photosensitive members formed from a polycarbonate resin, the drum flange and the drum gear of the present invention made of a polyacetal resin is advantageous in lower molding temperature (nozzle temperature, cylinder temperature, and mold temperature), higher productivity, and lower cost.

What is claimed is:

1. An electrophotographic photosensitive member comprising a photosensitive drum having an aluminum support, an instantaneous adhesive, and a drum flange or a drum gear bonded to said aluminum support with said instantaneous adhesive, said drum flange or the drum gear containing from 10 to 25 weight percent of a thermoplastic polyurethane resin based on total resin weight and a polyacetal resin.

2. An electrophotographic photosensitive member according to claim 1, wherein the polyacetal resin contains a component of the following structure:

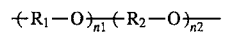

wherein $R^1$ and $R^2$ represent alkylene groups, $n^1$ represents a positive integer and $n^2$ represents 0 or a positive integer.

3. An electrophotosensitive member according to claim 2, wherein the $R^1$ and $R^2$ are methylene or ethylene.

4. An electrophotosensitive member according to claim 3, wherein the $R^1$ is methylene and $R^2$ is ethylene.

5. An electrophotographic apparatus comprising an electrophotographic photosensitive member, an electrostatic latent image forming member, a developing means to develop the electrostatic latent image and a transfer means to transfer the developed image onto the transfer medium;

said electrophotographic photosensitive member comprising a photosensitive drum having an aluminum support, an instantaneous adhesive, and a drum flange or a drum gear bonded to said aluminum support with said instantaneous adhesive, said drum flange or the drum gear containing from 10 to 25 weight percent of a thermoplastic polyurethane resin based on total resin weight and a polyacetal resin.

6. A device demountable from a main body of an electrophotographic apparatus comprising an electrophotographic photosensitive member, a charging means and a cleaning means, said electrophotographic photosensitive member comprising a photosensitive drum having an aluminum support, an instantaneous adhesive, and a drum flange or a drum gear bonded to said aluminum support with said instantaneous adhesive, the drum flange or the drum gear containing from 10 to 25 weight percent of a thermoplastic polyurethane resin based on total resin weight and a polyacetal resin, and said device unit retaining said electrophotographic photosensitive member, said charging means and said cleaning means in one unit.

7. A device unit according to claim 6, which includes a developing means.

8. A facsimile machine comprising an electrophotographic apparatus and a means for receiving image information from a remote terminal, said electrophotographic apparatus comprising an electrophotographic photosensitive member, said electrophotographic photosensitive member comprising a photosensitive drum having an aluminum support, an instantaneous adhesive, and a drum flange or a drum gear bonded to said aluminum support with said instantaneous adhesive, said drum flange or drum gear containing from 10 to 25 weight percent of a thermoplastic polyurethane resin based on total resin weight and a polyacetal resin.

\* \* \* \* \*

UNITED STATES PATENT AND TRADEMARK OFFICE
CERTIFICATE OF CORRECTION

PATENT NO. : 5,543,473

DATED : August 6, 1996

INVENTOR(S) : Naoki Fuei et al.

It is certified that error appears in the above-identified patent and that said Letters Patent is hereby corrected as shown below:

Title page, item
[56] REFERENCES CITED

Foreign Patent Documents, "0266365" should read --2-66365--.

Title page, item
[57] ABSTRACT

Line 4, "which" should read --which a--, and "and" should read --or--.

COLUMN 1

Line 45, "method" should read --methods--.
    Line 54, "and" should read --or--.
    Line 55, "are" should read --is--.

COLUMN 2

Line 7, "FIG." should read --FIGS.--.
    Line 10, "illustrate" should read --illustrates--.
    Line 57, "(isocyanstophenyl)," should read --isocyanatophenyl--.

UNITED STATES PATENT AND TRADEMARK OFFICE
CERTIFICATE OF CORRECTION

PATENT NO. : 5,543,473

DATED : August 6, 1996

INVENTOR(S) : Naoki Fuei et al.

It is certified that error appears in the above-identified patent and that said Letters Patent is hereby corrected as shown below:

COLUMN 3

Line 5, "resin" should read --resin,--.
    Line 27, "dispensor" should read --dispenser--.

COLUMN 4

Line 67, "was" should read --were--.

COLUMN 5

Line 66, "was" should read --was a--.

COLUMN 7

Line 52, "is" should read --are--.

UNITED STATES PATENT AND TRADEMARK OFFICE
CERTIFICATE OF CORRECTION

PATENT NO. : 5,543,473

DATED : August 6, 1996

INVENTOR(S) : Naoki Fuei et al.

It is certified that error appears in the above-identified patent and that said Letters Patent is hereby corrected as shown below:

<u>COLUMN 8</u>

Line 9, "$R^1$ and $R^2$" should read --$R_1$ and $R_2$-- and "$n^1$" should read --n1--.
Line 10, "$n^2$" should read --n2--.
Line 12, "$R^1$ and $R^2$" should read --$R_1$ and $R_2$--.
Line 14, "$R^1$" should read --$R_1$-- and "$R^2$" should read --$R_2$--.
Line 24, "the" should read --said--.

Signed and Sealed this

Fourteenth Day of January, 1997

Attest:

BRUCE LEHMAN

*Attesting Officer*   *Commissioner of Patents and Trademarks*